United States Patent [19]

LeBlond

[11] Patent Number: 4,749,314

[45] Date of Patent: Jun. 7, 1988

[54] SHEET MATERIAL DRILLING APPARATUS

[75] Inventor: Claude W. LeBlond, Broad Brook, Conn.

[73] Assignee: Gerber Garment Technology, West Tolland, Conn.

[21] Appl. No.: 45,000

[22] Filed: Apr. 30, 1987

[51] Int. Cl.⁴ .............................................. B23B 41/00
[52] U.S. Cl. ...................................... 408/68; 83/125; 83/140; 83/454; 408/95; 408/130
[58] Field of Search ...................... 408/68, 95, 97, 87, 408/88, 204, 207, 130, 67; 83/125, 128, 139, 140, 454

[56] References Cited

U.S. PATENT DOCUMENTS

| | | | |
|---|---|---|---|
| 2,637,396 | 5/1953 | Spiller et al. | 408/68 |
| 2,686,440 | 8/1954 | Van Cutsem | 408/61 |
| 3,066,554 | 12/1962 | Hanson | 408/87 |
| 3,125,883 | 3/1964 | Wollner | 408/204 |
| 3,289,500 | 12/1966 | Tarello | 408/88 |
| 3,730,634 | 5/1973 | Gerber et al. | 408/22 |
| 3,781,124 | 12/1973 | Bodycomb | 408/68 |
| 3,899,264 | 8/1975 | Tobias | 408/68 |

FOREIGN PATENT DOCUMENTS

| | | | |
|---|---|---|---|
| 7809532 | 3/1980 | Netherlands | 408/68 |
| 2044650 | 10/1980 | United Kingdom | 408/68 |

Primary Examiner—Gil Weidenfeld
Assistant Examiner—Daniel W. Howell
Attorney, Agent, or Firm—McCormick, Paulding & Huber

[57] ABSTRACT

An apparatus for drilling sheet material comprises a reciprocating subframe which rotatably supports an annular drill and pressing means. The pressing means holds the material down during drilling and strips the material from the drill when the subframe is raised.

14 Claims, 4 Drawing Sheets

SHEET MATERIAL DRILLING APPARATUS

BACKGROUND OF THE INVENTION

This invention relates to apparatus for drilling holes in sheet material such as, for example, sheets of flexible textile or plastic material used in the garment or upholstery industry, and deals more particularly with such a drilling apparatus for use in an automatically controlled machine wherein the drill and sheet material are moved relative to one another to allow the cutting of holes at various locations on the sheet material.

Although not so limited, the drilling apparatus of this invention has particular utility when used, as herein described, in association with an automatic machine for cutting cloth or other sheet material such as shown in U.S. patent application Ser. No. 06/861,148, and entitled Cutter Head and Knife for Cutting Sheet Material, wherein the drilling apparatus is attached to a work carriage movable in two coordinate directions over a sheet of sheet material, or over a lay-up of sheets of sheet material, spread on a supporting surface with the work carriage supporting a cutter for cutting the sheet material along lines of cut to produce pattern pieces used subsequently in making garments or other articles. The drilling apparatus is used alternately with the cutter to drill holes for marking or other purposes in the sheet material.

A drilling apparatus of the general type in question is shown by U.S. Pat. No. 3,730,634. As there disclosed the drilling apparatus includes an elongated hollow drill having a sharpened free lower end. In a drilling operation the drill is rotated about its central axis and moved downwardly through the sheet material so that the sharpened edge removes material, in the form of plugs or chips, which enters the central bore of the drill. Inwardly of the cutting edge the bore of the drill widens so that after the removed material passes a short distance from the cutting edge it enters an enlarged section of the bore at which it loses tight contact with the bore wall, thereby allowing it to move freely to and thru a lateral escape port.

The type of drill described in U.S. Pat. No. 3,730,634 has several disadvantages. Among these is the fact that the widening of the drill bore inwardly of the cutting edge requires that the drill have either a relatively thick wall or a bulbous outer profile giving the drill a maximum outer diameter considerably larger than the diameter of the hole cut in the material, this making it difficult for the drill to penetrate the material being cut, such difficulty being especially pronounced in the case of drilling a dense material such as tightly woven textiles or plastics. Another disadvantage is that the drills are relatively expensive to manufacture and have a relatively limited service life since they can only be shortened a small amount by sharpening before reaching the widened portion of the bore and becoming out of size.

An aim of the present invention is therefore to provide a sheet material drilling apparatus of the foregoing character using a drill which is easy and economical to manufacture, and which has a maximum outside diameter only slightly larger than the diameter of the hole to be cut so that the drill may pass readily thru the work material being cut.

A further object of the invention is to provide such a drilling apparatus including a means for positively driving or cleaning the removed material from the drill bore after each drilling operation to prevent the drill from becoming inoperative through the clogging of its bore.

A still further object of the invention is to provide a drilling apparatus of the foregoing character which is relatively light in weight yet powerful so as to adapt it for mounting to the work carriage of a high speed sheet material cutter of the type shown for example by the aforesaid U.S. patent application Ser. No. 06/861,148.

Another object of the invention is to provide a drilling apparatus having a pressure fluid motor for rotating the drill and a pressure fluid actuator for moving the drill into drilling relationship with the work material, and which motor and actuator are energized simultaneously at the beginning of and during a drilling operation from a common pressurized fluid supply line.

Other objects and advantages of the invention will be apparent from the following detailed description of a preferred embodiment and from the accompanying drawings and claims.

SUMMARY OF THE INVENTION

The invention resides in an apparatus for drilling sheet material wherein the material worked on is supported by a support means, such as a table, cooperating with a work carriage movable relative to the material to allow the tool or tools carried by the carriage to be moved to different locations and along different lines on the material. A base frame is fixed to the carriage and a sub-frame is mounted on the base frame for movement toward and away from the exposed surface of the supported sheet material. The sub-frame carries with it a drill and a motor for rotating the drill about its central axis, the axis of the motor output shaft preferably being spaced from and parallel to the central axis of the drill. The drill has a free end facing the exposed surface of the supported sheet material and a supported end located farther from the sheet material than the free end, with the central axis of the drill being arranged generally perpendicularly to the exposed surface. A stripper rod extends loosely into the bore of the drill and has a free end spaced from the exposed surface of the sheet material. The other end of the stripper rod is located outwardly beyond the supported end of the drill and is fixed to the base frame so that when the sub-frame moves relative to the base frame the stripper rod slides in the drill bore while nevertheless allowing the drill to rotate about its central axis and relative to the stripper rod. In a cutting operation the sub-frame is first moved from a retracted to an extended position during which the cutting edge of the drill moves thru the supported sheet material to cuttingly remove a portion of the sheet material, with the removed material entering the bore of the drill. Thereafter, the sub-frame is moved from its extended to its retracted position. During this movement the drill is removed from the sheet material taking with it the removed material to leave behind a clean hole, and the stripper rod then engages the removed material to push it out of the drill bore, thereby cleaning the drill bore for the next drilling operation.

DETAILED DESCRIPTION OF THE PREFERRED EMBODIMENT

Figure 1:
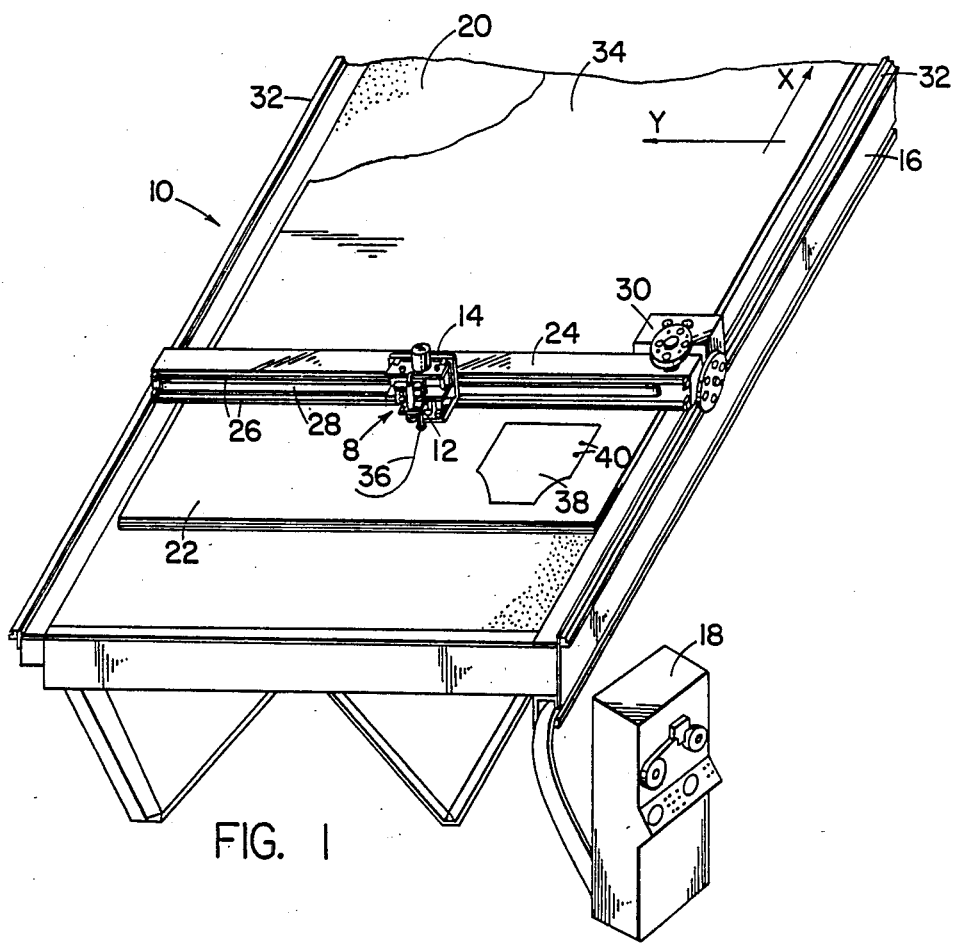
FIG. 1 is a fragmentary perspective view of an automatic cloth cutting machine including a drilling apparatus embodying this invention.

The drilling apparatus of this invention is useful in many different applications where it is mounted on a carriage or frame movable relative to the exposed surface of sheet material supported by an associated support means so that the apparatus can be moved to different locations on the exposed surface at which holes are to be drilled. FIG. 1 shows an exemplary application wherein the drilling apparatus, indicated generally at 8, is part of a cloth cutting machine 10 having a cutter head 12 mounted on a work carriage 14 along with the drilling apparatus 8. The machine 10 additionally, by way of major components, is comprised of a cutting table 16 and a numerical controller 18. Preferably, the table 16 has associated with it a vacuum system for holding in place and compacting the sheet material to be cut. Such vacuum system, for example, may be similar to that shown in application Ser. No. 736,839 filed May 22, 1985, now abandoned, but such system is not necessary to the present invention and has been omitted in FIG. 1 for clarity.

The table 16 has an elongated, rectangular, horizontal and upwardly facing work support surface 20 which acts as a means for supporting the sheet material to be cut in a spread condition. In FIG. 1 the material to be cut is shown as a low lay-up 22 consisting of a small number of layers of sheet material spread on top of one another. The machine 10 is intended to be a low cost, light weight, high speed one particularly adapted to the cutting of a low lay-up of sheet material, such as shown at 22, or to the cutting of a single layer of sheet material or to the cutting of a single web of sheet material which is folded upon itself to create two layers (such cutting being referred to as "cutting on the fold"). The drilling apparatus of the invention is not, however, necessarily limited to the cutting of low height lay-ups or single layers or double layers and may be incorporated into systems for cutting lay-ups of any height or number of layers.

The material forming the work support surface 20 of the table 16 may vary widely, but in any event it is one which allows the drill of the drilling apparatus 8 and the knife of the cutter head 12 to penetrate into it during a drilling operation and during a cutting operation. Preferably, the support surface is formed by a plurality of bristle elements or blocks fitted together to form a continuous bristle bed, as in the aforementioned application Ser. No. 736,839, with the bristles extending vertically. The particular construction of the bed forming the support surface 20 is not, however, important to the present invention and need therefore not be described in detail.

The work carriage 14 is supported, at a fixed height above the support surface 20, on an X-carriage 24 by two guide bars 26, 26, for movement in the illustrated Y-coordinate direction. Such movement is effected by a drive belt 28 fastened to the carriage 14 and passing over pulleys at opposite ends of the carriage 24, one of which pulleys is powered by a motor contained in a service module 30 attached to the carriage 24, the motor in turn being controlled by the numerical controller 18. At each of its opposite ends the X-carriage 24 is guided for movement relative to the table 16 by a combined guide rail and rack 32 extending along the associated side edge of the table, the carriage 24 having pinions (not shown) at its opposite ends engaging the racks and powered by another motor in the service module 30 controlled by the controller 18. Thus, by combined movement of the X-carriage 24 in the X-coordinate direction and the work carriage 14 in the Y-coordinate direction the work carriage 14 is movable over the exposed surface 34 of the lay-up 22 at a substantially constant height from such exposed surface, so that the drilling apparatus 8 may be moved to any desired location relative to the exposed surface and so that the cutter head 12 may be made to follow any desired line of cut on the exposed surface. One such line of cut is indicated at 36 and one stack of pattern pieces cut from the lay-up 22 is indicated at 38. Holes drilled in the lay-up 22 by the drilling apparatus 8 are indicated at 40, 40.

The present invention resides primarily in the construction of the drilling apparatus 8 whereby, among other things, the apparatus may be made to have a relatively low weight allowing the work carriage 14 of which it is a part to be rapidly accelerated and decelerated by reasonably sized motors, the apparatus further being of a powerful, rugged and non-clogging nature and using a drill having a profile allowing it to be inserted into the work material without undue resistance thereby permitting the rapid drilling of satisfactory holes even in relatively dense or tightly woven materials.

Figure 4:
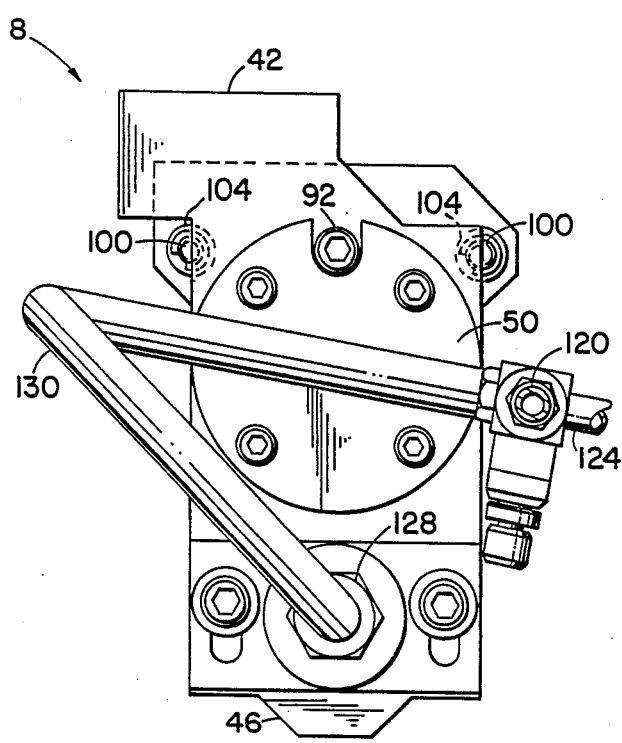
FIG. 4 is a plan view of the drilling apparatus of FIG. 2.
Figure 2:
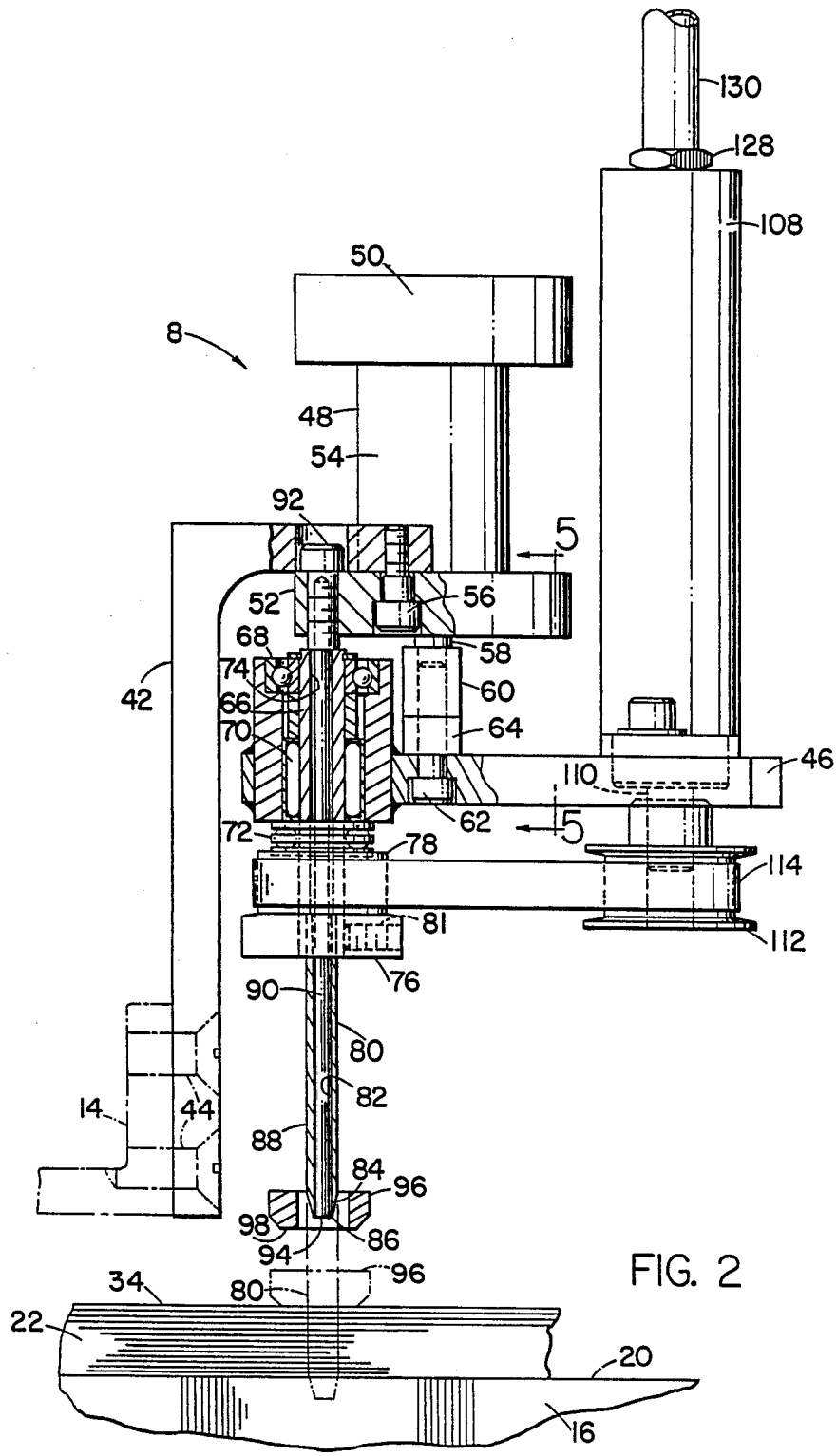
FIG. 2 is a side elevational view of the drilling apparatus of the machine of FIG. 1 with the solid lines showing the sub-frame in its retracted or raised position.
Figure 3:
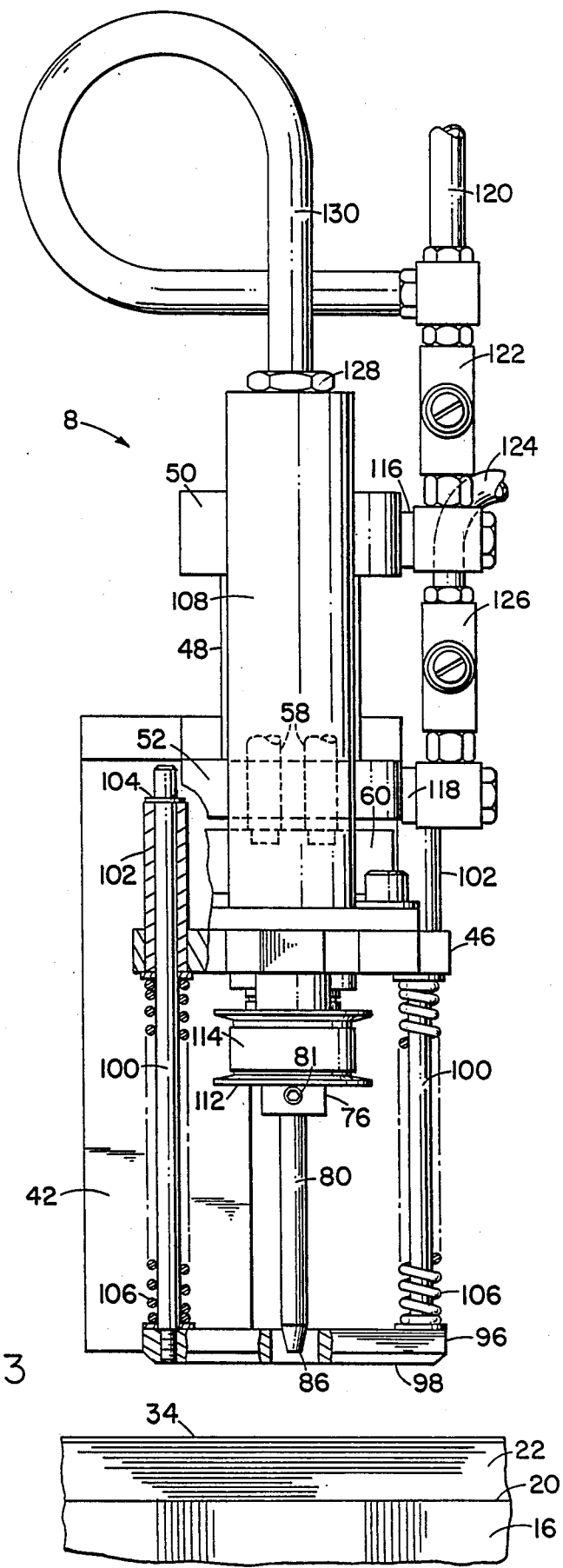
FIG. 3 is a front elevational view of the drilling apparatus of FIG. 2.
Figure 6:
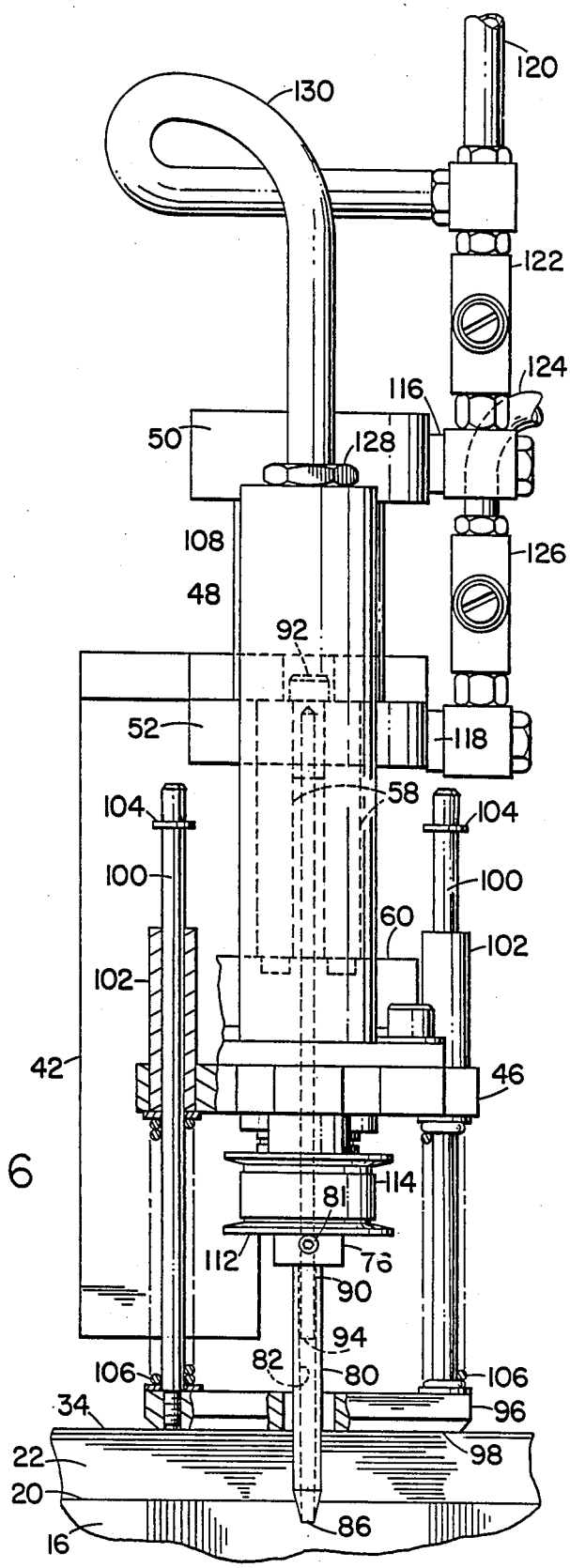
FIG. 6 is a view similar to FIG. 2 but with the subframe being shown in its extended or lowered position.

For an understanding of the construction of the drilling apparatus 8 reference is first made to FIGS. 2, 3 & 4. As seen in these figures, the apparatus includes a base frame 42 fixed to the work carriage 14 by a number of screws 44. The work carriage 14 is vertically fixed relative to the support surface 20 and therefore the base frame 42 is maintained at a substantially constant height above the exposed surface 34 of the lay-up 22 as the work carriage 14 and base frame 42 are moved to different positions relative to the exposed surface 34.

Figure 5:
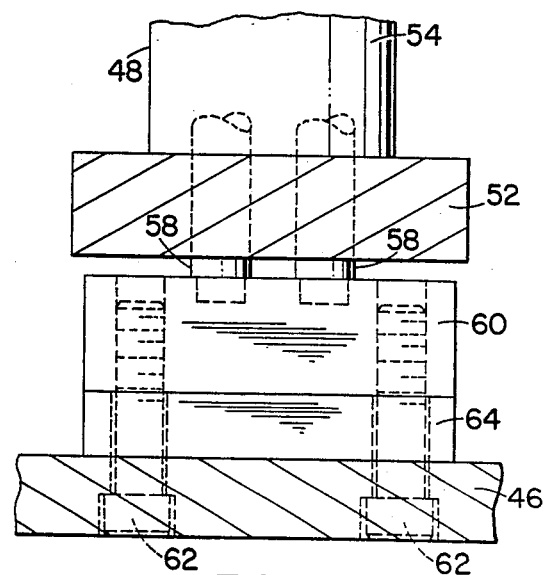
FIG. 5 is a sectional view taken on the line 5—5 of FIG. 2.

Associated with the base frame 42 is a sub-frame 46 supported for movement relative to the base frame in the vertical direction, or perpendicularly to the exposed surface 34 of the sheet material supported on the support surface 20. A means is also provided for driving the sub-frame 46 in such movement between a raised or retracted position, shown by the solid lines of FIGS. 2 and 3, and a lowered or extended position shown by the solid lines of FIG. 7 and the broken lines of FIG. 2. The support and drive means for the sub-frame may vary without departing from some features of the invention, but preferably and in accordance with one aspect of the invention the support and drive functions are essentially combined through the use of a double acting non-rotating pressure fluid actuator 48. The actuator 48 may be either pneumatically or hydraulically energized but preferably is a pneumatic actuator such as a BIMBA actuator model Flat-II type FT. The actuator 48 has a diametrically enlarged base end 50, a similiarly enlarged head end 52, and an intermediate piston carrying cylinder 54. The head end 52 is fixed to the base frame 42 by a number of screws, one of which is shown, for example, at 56 in FIG. 2. The actuator has two parallel piston rods 58, 58, fixed inside the cylinder 54 to the piston (not shown), which slidably pass thru the head end 52 and which at their outer ends are fixed to an output bar 60. The bar 60 is in turn fixed to the sub-frame 46 by two screws 62, 62, passing thru an intervening spacer 64 and threaded into the output bar 60 as shown in FIG. 5. The two piston rods 58, 58, non-rotatably support and guide the sub-frame 46 for vertical rectilinear movement relative to the base frame 42 and also drive the base frame in such movement between its retracted and extended positions.

On the sub-frame 46, as seen best in FIG. 2, is a spindle 66 supported for rotational movement relative to the sub-frame 46 about a vertical central axis by bearings 68, 70, and 72 and restrained by such bearings to vertical movement with the sub-frame. Extending completely thru the spindle from its upper to its lower end is a central axial bore 74. Fixed to the lower end of the spindle 66 is a chuck 76 including a toothed pulley 78. The chuck 76 receives the upper or support end of a drill 80 which is releasibly held in the chuck by a set screw 81.

The drill 80, as seen best Fig.2, is a simple tubular member having a bore 82 extending along the drill's central axis and of constant diameter. The drill is sharpened at its lower end by means of a generally conical surface 84 which intersects the surface of the bore 82 to define a circular downwardly facing cutting edge 86. Upwardly beyond the conical surface 84 the drill has a uniform diameter outer surface 88.

The central bore 82 of the drill extends fully from its lower end to its upper end and aligns and communicates with the bore 74 of the spindle 66 so that a continuous opening extends from the upper end of the spindle to the lower end of the drill. Slidably positioned in this opening is a stripper rod 90. The stripper rod 90 extends upwardly beyond the upper end of the spindle 66 and is fastened to the base frame 42 by means of a screw 92 threaded into and thru the head end 52 of the actuator 54, the upper end of the stripper rod being received by and adhesively or threadably fixed into a blind opening in the screw 92. The length of the stripper rod 90 is such that when the sub-frame 46 is in its retracted or raised position, as shown in FIG. 2, the lower end face 94 of the stripper rod is located approximately in the same plane as the circular cutting edge 86.

As best shown in FIG. 3, the sub-frame 46 also carries a presser foot 96 having a downwardly facing pressing surface 98. The presser foot 96 is supported by two rods 100 for a vertical sliding movement relative to the sub-frame 46 with the upper ends of the rods being received in guide sleeves 102, 102, fixed to the sub-frame 46. Downward movement of the presser foot 96 relative to the sub-frame is limited by a retainer ring 104, carried by the upper end of each rod 100, which engages the top of the associated sleeve 102 in the downward limit position of the presser foot 96. The presser foot is biased to this downward limit position by two springs 106, 106, each received on a respective one of the rods 100 and working between the presser foot 96 and the sub-frame 46. Preferably, in its downward limited position the presser foot 96 is located so that its pressing surface 98 is located below the cutting edge 86 of the drill. Therefore, when the sub-frame 46 is moved from its raised or retracted position toward its extended position the pressing surface 98 of the presser foot first engages the exposed surface 34 of the lay-up 22. Thereafter, further continued downward movement of the sub-frame 46 compresses the springs 100, 100, allowing the cutting edge 86 of the drill to move downwardly beyond the presser foot and into drilling relationship with the material of the lay-up 22.

When the sub-frame is moved from its lowered to its raised position the presser foot holds down the work material 22 while the drill 80 is lifted from the drilled hole. As evident from FIGS. 3 and 4 a portion of the base frame 42 extends horizontally above the upper end of the guide rods 100, 100, and when the sub-frame is in its fully raised position the upper ends of the guide rods are located very close to such overlying portion of the base frame. Therefore, should the material being drilled stick to the outside of the drill 80 with sufficient force that the presser foot, as pressed downwardly by the springs 106, 106, is not powerful enough to strip the work material 22 from the drill during the initial portion of the drills' raising movement, thereby causing the work material to move upwardly with the drill, when the sub-frame nears the upper limit of its movement the upper ends of the rods 100, 100, will strike the base frame to arrest their upward movement, with further upward movement of the sub-frame, under the power of the actuator 98, therefore moving the drill upwardly relative to the presser foot to positively strip the work material from the drill.

The stripper rod 90, being fixed to the base frame 42, remains vertically stationery and does not move downwardly with the drill 80. Therefore, when the drill moves through the lay-up 22 the lower portion of the drill bore 82 is free of the stripper rod so that the material cut or removed from the lay-up by the drilling operation can move into the bore. Due to the frictional resistance between the removed material and the wall of the drill bore, the removed material is generally lifted with the drill as the drill is subsequently raised from the lay-up. However, as the drill nears its fully raised position the lower end face 94 of the stripper rod is brought into engagement with the removed material in the drill bore and pushes such material from the drill bore to clean the drill bore for the next drilling operation.

The drill 80 is rotated during a drilling operation, and for this purpose the sub-frame 46 also carries a pressure fluid actuated motor 108 having a vertical output shaft 110. The motor is preferably a pneumatically actuated one and is taken as such in the figures. On the lower end of the output shaft 110 is a toothed pulley 112, and a positive driving connection is made between the motor 108 and the drill 80 by means of a toothed drive belt 114 trained over the two toothed pulleys 78 and 112.

Attention is next directed to the energization of the pneumatic actuator 48 and the pneumatic motor 108. The actuator 48 has a port 116 in its base end 50 to which pressurized air is supplied to extend the piston rods 58, 58, to move the sub-frame 46 from its raised to its lowered position. Likewise, another port 118 is provided in the head end 52 to which pressurized air is supplied to retract the piston rods 58, 58, and to thereby move the sub-frame 46 from its lowered to its raised position. The port 116 is connected to a supply line 120 thru an adjustable flow restricting valve 122. The port 118 is connected to another supply line 124 thru another adjustable flow restricting valve 126. The flow restricting valves 122 and 126 control the speed at which the piston rods are retracted or extended and can be adjusted to vary such rates of extension and retraction. The supply lines 120 and 124 are connected to a suitable control valve (not shown) which supplies pressurized air to one or the other of the lines at the proper times, and it also operates when one of the lines is supplied with pressurized air to vent the other line to atmosphere.

The motor 108 has an inlet port 128 connected by a tube 130 to the supply line 120 in parallel with the base end port 116 of the actuator 48. The motor also has another port (not shown) through which spent air is exhausted to atmosphere. When pressurized air is supplied to the supply line 120 it is delivered simultaneously both to the motor 108, to energize the motor and thereby cause rotation of the drill 80, and to the actuator 48, to cause the actuator to drive the sub-frame 46 downwardly from its retracted position to its extended position. Accordingly, the single act of supplying pressurized air to the line 120 causes rotation of the drill and movement of it downwardly into drilling relationship with the lay-up 22.

I claim:

1. An apparatus for drilling sheet material, said apparatus comprising;

a base frame, support means for supporting sheet material so that one face of such sheet material is exposed, means for moving said base frame and sheet material supported by said support means relative to one another with said base frame being maintained at a substantially constant spacing from the exposed surface of such sheet material, a sub-frame supported on said base frame for movement relative to said base frame in a direction generally perpendicular to the exposed face of sheet material supported by said support means, an elongated drill having a free end close to sheet material supported by said support means and a support end located farther from such sheet material than said free end, said drill also having a central axis and a longitudinal bore extending therethrough parallel to and concentric with said central axis, means engaging said support end of said drill and thereby supporting said drill on said sub-frame for movement therewith relative to said base frame and for rotation about its central axis with said central axis arranged generally perpendicularly to the exposed surface of sheet material supported by said support means, said drill having its free end sharpened to define a generally circular cutting edge facing the exposed face of sheet material supported by said support means, means for driving said drill about its central axis, a stripper rod positioned in said bore of said drill, said stripper rod having a free end facing the exposed surface of sheet material supported by said support means and also having an opposite end extending out of said support end of said drill and fixed to said base frame, means for moving said sub-frame relative to said base frame between retracted and extended positions, said drill in said retracted position of said sub-frame having its free end spaced from the exposed surface of sheet material supported by said support means and in said extended position of said sub-frame having its free end located beyond the opposite face of such sheet material so that as said sub-frame is moved from said retracted to said extended position said cutting edge of said drill cuts a hole in sheet material supported by said support means with the removed portion of such sheet material entering said bore of said drill, said free end of said stripper rod being located in spaced relation to the exposed surface of sheet material supported by said support means so that when said sub-frame is moved from its extended to its retracted position said free end of said stripper rod pushes said removed material out of said drill bore, and pressing means supported by said sub-frame for generating a pressure on the exposed surface of the sheet material in the vicinity of said drill when said sub-frame is in said extended position, said pressing means including means abuttingly engageable with said base frame when said sub-frame is moved from its extended to its retracted position for positively causing said pressure means to strip the sheet material from said drill.

2. An apparatus as defined in claim 1 further characterized by said free end of said stripper rod having an end face which is located at least approximately in the plane of said cutting edge of said drill when said sub-frame is in its retracted position.

3. An apparatus as defined in claim 1 further characterized by said drill bore having a substantially constant diameter along the length of said drill.

4. An apparatus as defined in claim 1 further characterized by said drill being a length of tube having a portion of generally conical shape adjacent said cutting edge and a remaining portion of substantially constant outside diameter, said bore of said drill having a substantially constant diameter along the length of said drill.

5. An apparatus as defined in claim 1 further characterized by said means for driving said drill including a motor having an output shaft drivingly connected with said drill and which motor is mounted on said sub-frame for movement therewith relative to said base frame.

6. An apparatus as defined in claim 5 further characterized by said output shaft of said motor being rotatable about a second axis, and said motor being mounted on said sub-frame so that said second axis is in spaced parallel relationship to said central axis of said drill.

7. An apparatus as defined in claim 6 further characterized by said means for driving said drill including a first toothed pulley fixed to said motor output shaft, a second toothed pulley fixed to said drill, and a toothed belt trained over said first and second pulleys.

8. An apparatus as defined in claim 1 further characterized by said means for rotatably supporting said drill including a spindle having a central axis, means supporting said spindle for rotation about its central axis relative to said sub-frame and constraining it to movement with said sub-frame relative to said base frame, said spindle having first and second ends and a bore extending therethrough between said first and second ends along its said central axis, and a chuck fixed to said one end of said spindle for releasably holding said drill, said drill when received in said chuck having its bore aligned with the bore of said spindle so that said two bores form a continuous opening from said second end of said spindle to said free end of said drill, said stripper rod extending out of said spindle at said second end of said spindle and being fixed to said base frame adjacent said second end of said spindle.

9. An apparatus as defined in claim 5 further characterized by said motor being a pressure fluid actuated motor having a supply port to which pressure fluid is supplied for energizing said motor, said means for moving said sub-frame relative to said base frame being a pressure fluid actuator having a supply port to which pressure fluid is supplied to cause said actuator to move said sub-frame from said retracted position to said extended position, and means for connecting said supply port of said motor and said supply port of said actuator in parallel with one another to a pressure fluid supply line so that when pressure fluid is supplied to said supply line said motor is energized to rotate said drill at the same time as said actuator is energized to move said sub-frame from its retracted to its extended position.

10. An apparatus as defined in claim 1 further characterized by said pressing means including a presser foot assembly carried by said sub-frame, said presser foot assembly including a presser foot having a pressing surface facing the exposed surface of sheet material supported by said support means, means slidably connecting said presser foot to said sub-frame for movement relative to said sub-frame in the direction generally perpendicular to said exposed surface of said sheet material, means limiting the movement of said presser foot relative to said sub-frame in the direction toward said sheet material to a given limit position, said presser foot when in said limit position being so positioned relative to said drill that said pressing surface is located between said exposed surface of said sheet material and said free end of said drill, and spring means biasing said presser foot toward said limit position and resiliently resisting its movement away from said limit position toward said support end of said drill so that when said sub-frame is moved from said retracted position toward said extended position said pressing surface first engages said exposed surface of said sheet material and said presser foot then moves relative to said sub-frame against the biasing force of said spring means to allow said free end of said drill to move beyond said pressing surface and into said sheet material.

11. An apparatus as defined claim 10 further characterized by said means abuttingly engageable with said base frame including coengageable stop means fixed relative to said presser foot and to said base frame restricting presser foot movement in the direction away from said sheet material and relative to said base frame to substantially the position assumed by said presser foot when said presser foot is in said given limit position relative to said sub-frame and said sub-frame is in said retracted position relative to said base frame, so that in the event the sheet material being drilled sticks to the outside of said drill as said sub-frame is moved from its extended to its retracted position when said sub-frame nears its retracted position said coengageable stop means will coengage and arrest movement of said presser foot so that subsequent further movement of said sub-frame toward its retracted position will cause said presser foot to strip said sheet material from said drill.

12. An apparatus as defined in claim 1 further characterized by said actuator being one having at least one non-rotatable piston rod, said at least one non-rotatable piston rod being the sole means connecting said sub-frame to said base frame for movement in the direction generally perpendicular to the exposed face of sheet material supported by said support means.

13. An apparatus for drilling sheet material, said apparatus comprising;
a base frame,
support means for supporting sheet material so that one face of such sheet material is exposed,
means for moving said base frame and sheet material supported by said support means relative to one another with said base frame being maintained at a substantially constant spacing from the exposed surface of such sheet material,
a sub-frame supported on said base frame for movement relative to said base frame in a direction generally perpendicular to the exposed face of sheet material supported by said support means,
pressing means supported by said sub-frame for generating a pressure on the exposed surface of the sheet material in the vicinity of said drill when said sub-frame is in said extended position,
said pressing means including means abuttingly engageable with said base frame when said sub-frame is moved from its extended to its retracted position for positively causing said pressure means to strip the sheet material from said drill.
an elongated drill having a free end close to sheet material supported by said support means and a support and located farther from such sheet material than said free end,
means engaging said support end of said drill and thereby supporting said drill on said sub-frame for movement therewith relative to said base frame and for rotation about its central axis with said central axis arranged perpendicularly to the exposed surface of sheet material supported by said support means,
a pressure fluid motor mounted on said sub-frame for movement therewith relative to said base frame and having an output shaft drivingly connected with said drill for rotating said drill about its central axis,
a pressure fluid actuator for moving said sub-frame relative to said base frame between retracted and extended positions, said drill in said retracted position of said sub-frame having its free end spaced from the exposed surface of sheet material supported by said support means and in said extended position of said sub frame having its free end located beyond the opposite face of such sheet material so that as said sub-frame is moved from said retracted to said extended position said drill cuts a hole in sheet material supported by said support means,
said motor having a port to which pressure fluid is supplied for energizing said motor, and said actuator having a port to which pressure fluid is supplied to cause said actuator to move said sub-frame from said retracted position to said extended position, and
means for connecting said motor and actuator ports in parallel with one another to a pressure fluid supply line so that when pressure fluid is supplied to said supply line said motor is energized to rotate said drill at the same time as said actuator is energized to move said sub-frame from its retracted to its extended position.

14. An apparatus for drilling sheet material, said apparatus comprising;
a base frame,
support means for supporting sheet material so that one face of such sheet material is exposed,
means for moving said base frame and sheet material supported by said support means relative to one another with said base frame being maintained at a substantially constant spacing from the exposed surface of such sheet material, a sub-frame supported on said base frame for movement relative to said base frame in a direction generally perpendicular to the exposed face of sheet material supported by said support means, an elongated drill having a free end close to sheet material supported by said support means and a support end located farther from such sheet material than said free end, said drill also having a central axis and a longitudinal bore extending therethrough parallel to and concentric with said central axis, means engaging said support end of said drill and thereby supporting said drill on said sub-frame for movement therewith relative to said base frame and for rotation about its central axis with said central axis arranged generally perpendicularly to the exposed surface of sheet material supported by said support means, said drill having its free end sharpened to define a generally circular cutting edge facing the exposed face of sheet material supported by said support means, means for driving said drill about its central axis, a stripper rod positioned in said bore of said drill, stripper rod having a free end facing the exposed surface of sheet material supported by said support means and also having an opposite end extending out of said support end of said drill and fixed to said base frame, means for moving said sub-frame relative to said base frame between retracted and extended positions, said drill in said retracted position of said sub-frame having its free end spaced from the exposed surface of sheet material supported by said support means and in said extended position of said sub-frame having its free end located beyond the opposite face of such sheet material so that as said sub-frame is moved from said retracted to said extended position said cutting edge of said drill cuts a hole in sheet material supported by said support means with the removed portion of such sheet material entering said bore of said drill, said free end of said stripper rod being located in spaced relation to the exposed surface of sheet material supported by said support means so that when said sub-frame is moved from its extended to its retracted position said free end of said stripper rod pushes said removed material out of said drill bore, a presser foot assembly carried by said sub-frame, said presser foot assembly including a presser foot having a pressing surface facing the exposed surface of sheet material supported by said support means, means slidably connecting said presser foot to said sub-frame for movement relative to said sub-frame in the direction generally perpendicular to said exposed surface of said sheet material, means limiting the movement of said presser foot relative to said sub-frame in the direction toward said sheet material to a given limit position, said presser foot when in said limit position being so positioned relative to said drill that said pressing surface is located between said exposed surface of said sheet material and said free end of said drill, and spring means biasing said presser foot toward said limit position and resiliently resisting its movement away from said limit position toward said support end of said drill so that when said sub-frame is moved from said retracted position toward said extended position said pressing surface first engages said exposed surface of said sheet material and said presser foot then moves relative to said sub-frame against the biasing force of said spring means to allow said free end of said drill to move beyond said pressing surface and into said sheet material, coengageable stop means fixed relative to said presser foot and to said base frame restricting presser foot movement in the direction away from said sheet material and relative to said base frame to substantially the position assumed by said presser foot when said presser foot is in said given limit position relative to said sub-frame and said sub-frame is in said retracted position relative to said base frame, so that in the event the sheet material being drilled sticks to the outside of said drill as said sub-frame is moved from its extended to its retracted position when said sub-frame nears its retracted position said coengageable stop means will coengage and arrest movement of said presser foot so that subsequent further movement of said sub-frame toward its retracted position will cause said presser foot to strip said sheet material from said drill.

* * * * *